May 8, 1945.  J. W. ASPENLEITER  2,375,339
OPHTHALMIC MOUNTING
Filed July 31, 1942

JOSEPH W. ASPENLEITER
INVENTOR
BY
ATTORNEYS

Patented May 8, 1945

2,375,339

UNITED STATES PATENT OFFICE 2,375,339

OPHTHALMIC MOUNTING

Joseph W. Aspenleiter, Rochester, N. Y., assignor to Bausch & Lomb Optical Company, Rochester, N. Y., a corporation of New York Application July 31, 1942, Serial No. 453,054

6 Claims. (Cl. 88—43)

This invention relates to ophthalmic mountings and more particularly to such a mounting in which the lenses may be selectively positioned relative to the vertical center of the mounting.

On certain classes of ophthalmic mountings, and particularly goggles, it is desirable to provide some means for changing the distance between the centers of the lenses without changing the relation of the axis to the horizontal.

This adjustment of the interpupillary distance is generally accomplished by means of a bridge which permits the lenses to be moved toward or away from the vertical center of the goggle. A large number of bridges which might be adjusted have been heretofore proposed, but if the bridge was one which could be easily adjusted, it generally was not durable or one which would detract from the appearance of the goggle.

One of the objects of this invention is to provide a bridge which may be readily adjusted for various interpupillary distances, yet durable and of a design and construction such as will not detract from the appearance of the goggle.

Other objects and advantages such as size, novel features of construction, arrangement, and combination of parts will hereinafter be more fully described in the appended claims.

Referring to the drawing.

Figure 1:
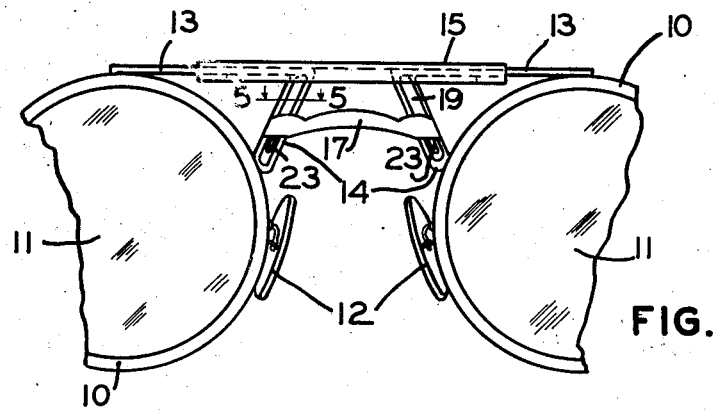
Figure 1 shows a front elevation of an ophthalmic mounting embodying my invention.
Figure 2:
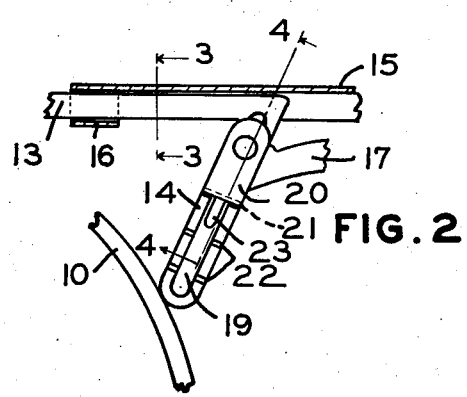
Figure 2 shows a rear elevation of a fragmentary part of an ophthalmic mounting embodying my invention.

A preferred embodiment of my invention is illustrated in the drawing wherein there is shown a pair of goggles comprising two eyewires 10 which hold the lenses 11 which, if desired, may be hardened. The temporal sides of the eyewires 10 may carry endpieces, not shown, to which conventional temples may be connected in the usual manner. Nose pads 12 are secured to adjacent portions of the eyewires as by soldering or other conventional means.

Figure 3:
Figure 3 is an enlarged sectional view taken along line 3—3 of Figure 2.
Figure 4:
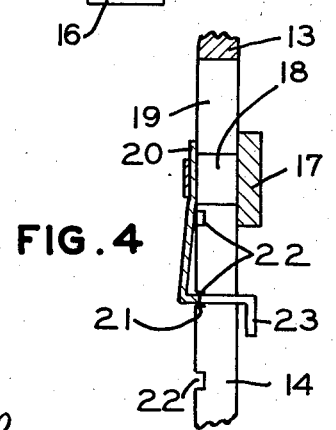
Figure 4 is an enlarged sectional view taken along line 4—4 of Figure 2.
Figure 5:
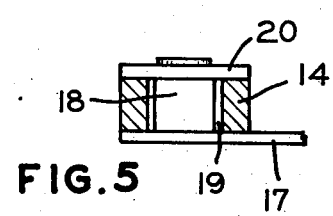
Figure 5 is an enlarged sectional view taken along line 5—5 of Figure 1.
Figure 6:
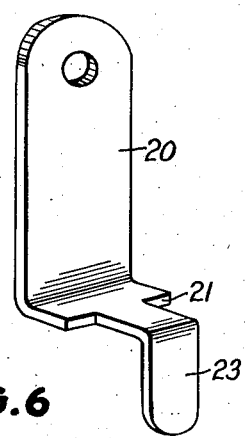
Figure 6 is a perspective view of a detail.

The bridge of the present invention comprises bars 13 having the opposite ends thereof secured to the upper portion of the eyewires 10. The adjacent ends of the bars 13 are bent downward to form diverging arms 14 connected at their lower ends to the side portions of the eyewires 10. A channel-shaped member 15 receives the adjacent portions of the bars 13 which are held within the channel of the same, referring now to Figure 3, by a finger 16 formed on the channel member 15 and bent over after the bars are assembled therewith.

A bridge bar 17 formed at the opposite ends thereof with laterally projecting lugs 18 also connects the eyewires for the lugs 18 are slidably received within slots 19 formed in the diverging arms 14 of the bars 13. To hold the lugs within the slots, retaining plates 20 of a width greater than the width of the slots are secured to the ends of the lugs projecting through the slots.

As the lugs are slidably received within the slots 19, the bar 17 may be adjusted relative to the diverging arms 14. This movement of the bar 17 is used to adjust the lenses for various interpupillary distances. It will be seen that when the bar 17 is moved upwardly, the opposite faces of the lugs 18 as they engage the converging outer walls of the slots 19, force the arms 14 outwardly, causing the lenses to move apart. If the bar 17 is moved downwardly, the adjacent faces of the lugs 18 as they engage the inner walls of the slots cam the arms 14 inwardly and bring the lenses closer together.

To hold the lenses in the desired adjusted relative position, any means desired may be employed but in the preferred embodiment of the present invention, this means comprises resilient detents for latching the opposite ends of the bar 17 to the arms 14. The detents, as shown, may comprise shoulders 21 formed on the plates 20 by reducing a portion of the bent over ends thereof. The shoulders when engaged in transverse notches 22, formed on the arms 14, will lock the arms against accidental movement. The reduced ends of the plates are preferably bent over to project through the slots and form actuators 23 for moving the shoulders 21 out of the notches 22 when it is desired to adjust the relative position of the lenses.

The channel member 15 as well as the cam and follower construction of the present invention braces the eyewires and the goggle is extremely rigid and not likely to get out of adjustment although a desired adjustment may be very easily and quickly made. With all of this, the goggle is pleasing in appearance and is as easily worn as conventional spectacles.

Although I have shown my invention as applied to lens holding devices which completely encircle the lenses, it is obvious that it can be applied equally well to the lens holding devices used on the so-called rimless or semi-rimless types, and if desired, the arms 14 may be made so as to diverge upwardly from the lens holding devices. Various other modifications can obviously be made without departing from the spirit of my invention.

I claim:

1. An ophthalmic mounting comprising a pair of lens holding devices; a slotted arm obliquely projecting upward from each lens holding device, said arms being disposed in converging relationship in a common plane; rigid means connecting said slotted arms including means riding in the slots thereof; and a channel-shaped member slidably receiving the upper ends of the slotted arms, adjustment of the connecting means relative to the slotted arms causing the means thereof riding in the slots to force said arms and the lens holding devices apart or draw them together, depending upon the direction of movement of the connecting means.

2. An ophthalmic mounting comprising a pair of lens holding devices; a bar carried by the upper portion of each device and projecting toward the other; an arm obliquely projecting downwardly from each bar and secured to the corresponding lens holding device, said arms being in diverging relationship relative to each other and disposed in a common plane, each arm having a slot extending longitudinally thereof; a bridging member; and lugs carried by the opposite ends of said bridging member and slidably received within the slots of said arms, the action between the faces of said lugs and the inclined walls of the slots urging said lens holding devices in opposite directions as the bridging member is moved in opposite directions.

3. An ophthalmic mounting comprising a pair of lens holding devices; a bar carried by the upper portion of each device and projecting toward the other; an arm obliquely projecting downwardly from each bar and secured to the corresponding lens holding device, said arms being in diverging relationship relative to each other and disposed in a common plane, each arm having a slot extending longitudinally thereof; a bridging member; lugs carried by the opposite ends of said bridging member and slidably received within the slots of said arm; the action between the faces of the lugs and the inclined walls of the slots in the diverging arms urging said lens holding devices in opposite directions as the bridging member is moved in opposite directions, said slotted arms having transversely formed notches therein; and spring detent means carried by said bridging member for reception within said notches to hold said lens holding devices in a desired adjusted position.

4. An ophthalmic mounting comprising a pair of lens holding devices; a bar carried by the upper portion of each device and projecting toward the other; an arm obliquely projecting downwardly from each bar and secured to the corresponding lens holding device, said arms being in diverging relationship relative to each other and disposed in a common plane, each arm having a slot extending longitudinally thereof; a bridging member; lugs carried by the opposite ends of said bridging member and slidably received within the slots of said arms, the action between the opposite faces of the lugs and the inclined walls of the slots urging said lens holding devices in opposite directions as the bridging member is moved in opposite directions, said slotted arm having transversely formed notches therein; and spring detent means carried by said bridging member for reception within said notches to hold said lens holding devices in a desired adjusted position; and actuator means for moving the detent means out of said notches when it is desired to effect an adjustment of the lens holding devices.

5. An ophthalmic mounting comprising a pair of lens holding devices; a pair of slotted arms converging upwardly in a common plane from said lens holding devices; rigid means connecting said slotted arms including means riding in the oppositely-inclined slots thereof; and a channel-shaped member slidably receiving the upper ends of the slotted arms, adjustment of the connecting means relative to the slotted arms causing the means thereof riding in the inclined slots to force said arms and the lens holding devices apart or draw them together, depending upon the direction of movement of the connecting means.

6. An ophthalmic mounting comprising a pair of lens holding devices; a bar carried by each device, said bars projecting toward each other; an arm connected to each of said bars, said arms lying in a common plane and diverging downwardly from said bars and secured to said lens holding devices, each arm having a slot extending longitudinally thereof; a bridging member; and lugs carried by the opposite ends of said bridging member and slidably received within the slots of said arms, the action between the faces of said lugs and the oppositely inclined walls of the slots urging said lens holding devices in opposite directions as the bridging member is moved in opposite directions.

JOSEPH W. ASPENLEITER.